US012514735B2

(12) United States Patent
McClellan et al.

(10) Patent No.: US 12,514,735 B2
(45) Date of Patent: Jan. 6, 2026

(54) NONINVASIVE MEDICAL BRACE

(71) Applicants: William T. McClellan, Morgantown, WV (US); Justin Ronald Chambers, Morgantown, WV (US)

(72) Inventors: William T. McClellan, Morgantown, WV (US); Justin Ronald Chambers, Morgantown, WV (US)

( * ) Notice: Subject to any disclaimer, the term of this patent is extended or adjusted under 35 U.S.C. 154(b) by 491 days.

(21) Appl. No.: 17/683,823

(22) Filed: Mar. 1, 2022

(65) Prior Publication Data

US 2022/0273481 A1 Sep. 1, 2022

Related U.S. Application Data

(60) Provisional application No. 63/281,179, filed on Nov. 19, 2021, provisional application No. 63/154,991, filed on Mar. 1, 2021.

(51) Int. Cl.
*A61F 5/058* (2006.01)
(52) U.S. Cl.
CPC ...... *A61F 5/05833* (2013.01); *A61F 5/05825* (2013.01)

(58) Field of Classification Search
CPC .... A61F 5/04; A61F 5/05; A61F 5/058; A61F 5/05825; A61F 5/05833; A61B 2017/00566
See application file for complete search history.

(56) References Cited

U.S. PATENT DOCUMENTS

| | | | | |
|---|---|---|---|---|
| 4,657,003 A | * | 4/1987 | Wirtz | A61F 5/05833 128/869 |
| 6,971,995 B2 | | 12/2005 | Rolnick et al. | |
| 8,852,132 B2 | | 10/2014 | Bolla | |
| 10,457,014 B2 | * | 10/2019 | Corrigan | D04H 13/00 |
| 2015/0369325 A1 | * | 12/2015 | Bureau | F16F 9/04 428/35.4 |
| 2017/0231796 A1 | * | 8/2017 | Romo | A61F 5/0195 602/16 |
| 2018/0220962 A1 | * | 8/2018 | Palley | A61B 5/0004 |

* cited by examiner

*Primary Examiner* — Keri J Nelson
(74) *Attorney, Agent, or Firm* — Calderon Safran & Wright P.C.

(57) ABSTRACT

A rib brace includes: a sealed enclosure; an adhesive on an external side of the sealed enclosure, the adhesive configured to adhere the rib brace to a person externally and noninvasively to the person; a layered structure inside the sealed enclosure; and a port through a wall of the sealed enclosure, wherein a stiffness of the layered structure is adjustable by applying suction to an interior of the sealed enclosure via the port.

20 Claims, 4 Drawing Sheets

NONINVASIVE MEDICAL BRACE

PRIORITY

This application claims priority to provisional application No. 63/154,991 filed Mar. 1, 2021, and provisional application No. 63/281,179 filed Nov. 19, 2021, the disclosures of which are incorporated by reference herein in their entirety.

FIELD OF THE INVENTION

The invention generally relates to medical devices and associated methods of manufacture and use, and more particularly to noninvasive rib braces.

BACKGROUND

Rib fractures may be treated invasively with surgery that stabilizes a rib using hardware, such as screws and plates, connected directly to the rib. Noninvasive techniques for treating rib fractures include wrapping the torso with standard bandages and using ice compression. A specialized type of wrapping is a rib belt. Wrapping a torso in this manner often alleviates pain in the patient but also compresses the chest and prevents full pulmonary function in the patient. As a result, wrapping techniques often lead to pneumonia in the patient due to the patient's breathing being restricted by the wrapping.

SUMMARY

In a first aspect of the invention, there is a rib brace comprising: a sealed enclosure; an adhesive on an external side of the sealed enclosure, the adhesive configured to adhere the rib brace to a person externally and noninvasively to the person; a layered structure inside the sealed enclosure; and a port through a wall of the sealed enclosure, wherein a stiffness of the layered structure is adjustable by applying suction to an interior of the sealed enclosure via the port.

In another aspect of the invention, there is a rib brace comprising: an adhesive layer; a rigid layer; and a cushion layer between the adhesive layer and the rigid layer, wherein the adhesive layer is configured to adhere the rib brace to a person externally and noninvasively to the person; and a stiffness of the rib brace is adjustable by turning an adjustment knob at a central portion of the rigid layer.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
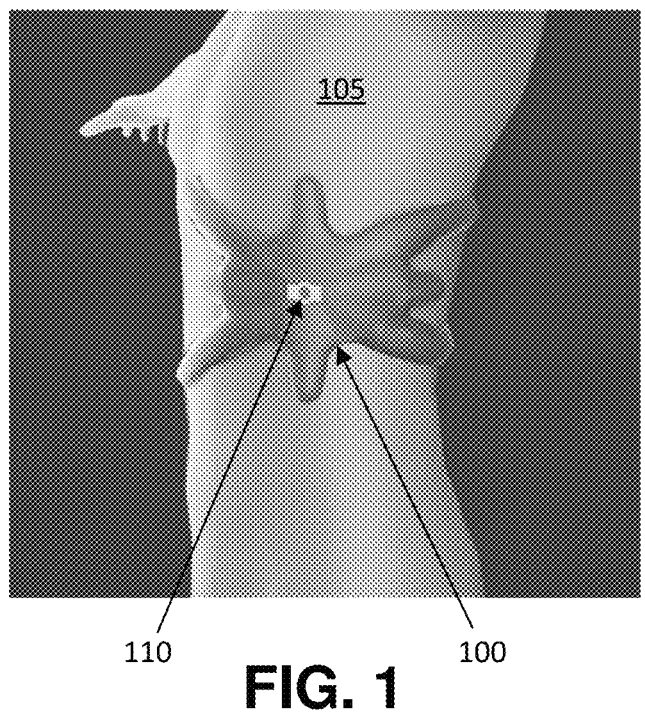
FIGS. 1 and 2 show an example of a rib brace in accordance with aspects of the invention.
Figure 2:
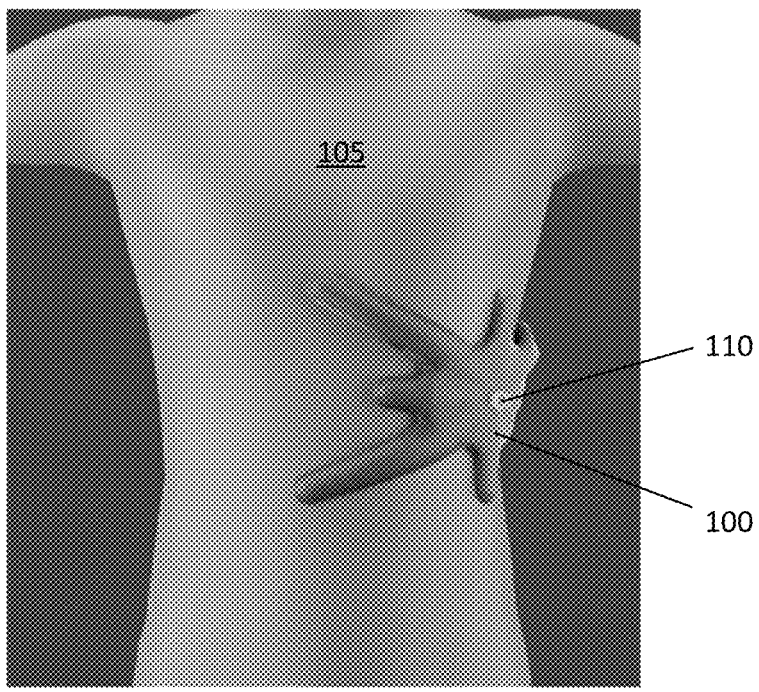

FIGS. 1 and 2 show an example of a rib brace 100 in accordance with aspects of the invention. In embodiments, the brace 100 is applied externally to the torso 105 of a patient without piecing the skin of the patient. In this manner, the brace 100 is noninvasive to the patient. The brace 100 is configured, when applied to a patient, to fixate or stabilize broken, fractured, or bruised ribs. In implementations, the brace 100 is secured to the torso 105 by adhesive. The brace 100 can be placed at different locations and in different positions (i.e., orientations) on the torso 105. In embodiments, the brace 100 may be manufactured or adjusted to have different sizes and configurations to meet the needs of a specific patient. In embodiments, the brace 100 includes a port 100 that provides for applying suction to an interior cavity of the brace 100, as described in greater detail herein.

The brace 100 may have any desired shape. In the exemplary embodiment shown in FIGS. 1 and 2, the brace 100 includes a central portion and appendages extending outward from the central portion. In this example, the brace 100 includes a first number of short appendages and a second number of long appendages. In accordance with aspects of the invention, and as described herein, the brace 100 has a first state in which the brace 100 is relatively pliable, such that the central portion and the appendages may be manipulated (e.g., bent, flexed, and/or twisted) for the purpose of conformally applying the brace 100 to the torso 105. In accordance with aspects of the invention, and as described herein, the brace 100 has a second state in which the brace is relatively rigid, such that the brace 100 (including the central portion and the appendages) can be locked into a particular shape after having been conformally applied to the torso 105. In embodiments, the brace 100 is placed in the second state by applying suction to the port 110, which causes a jamming of materials inside the brace 100.

Figure 3:
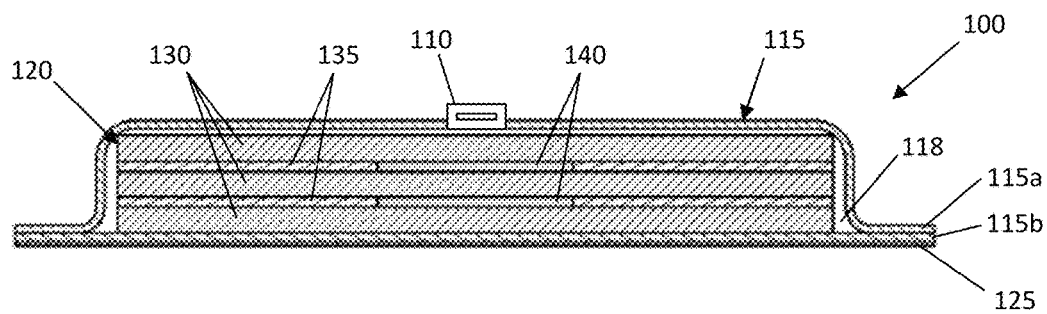
FIG. 3 shows a cross section of a rib brace in accordance with aspects of the invention.

FIG. 3 shows a cross section of the exemplary rib brace 100 in accordance with aspects of the invention. In the example shown in FIG. 3, the brace 100 includes an enclosure 115 that surrounds a layered structure 120, also referred to herein as a jam sheet layer. The enclosure 115 is airtight and flexible. The enclosure 115 may comprise plural layers 115a, 115b that are connected together to maintain an airtight seal. For example, each of the layers 115a, 115b may be composed of plastic sheets that are heat welded to one another at various locations (e.g., around an entire perimeter) to create an airtight connection between the sheets. For example, the layers 115a, 115b may be composed of pliable sheets of polyethylene, PVC, or polystyrene.

As shown in FIG. 3, in accordance with aspects of the invention, the brace 100 includes a port 110 that extends through the enclosure 115 and that is configured to selectively place the interior 118 of the enclosure 115 in fluidic communication with an atmosphere exterior to the enclosure 115. In embodiments, the port 110 comprises a valve that selectively permits airflow into or out of the interior of the enclosure 115. In one example, the valve has a closed state and an open state. In the closed state, the valve prevents airflow into or out of the interior of the enclosure 115. In the open state, the valve permits airflow into or out of the interior of the enclosure 115. In this example, the valve is biased to the closed state, and the open state is achieved by physically manipulating the valve. In implementations, a suction device (not shown) that is exterior to the brace 100 is connected to the port 110 to apply suction to the interior 118 of the enclosure 115. The brace 100 is configured such that applying suction to the interior 118 of the enclosure 115, via the port 110, causes the enclosure 115 to constrict around the layered structure 120, e.g., similar to the operation of a vacuum storage bag. In embodiments, constricting the enclosure 115 around the layered structure 120 in this manner imparts a compressive force to the layered structure 120, which changes the stiffness of the brace 100 as a whole, as described in greater detail herein.

In accordance with aspects of the invention, and as shown in FIG. 3, the brace 100 includes an adhesive layer 125 that is configured to adhere the brace 100 to the torso 105 of a patient. In embodiments, the adhesive layer 125 comprises a biocompatible adhesive, such as a biocompatible silicone adhesive, for example.

As shown in FIG. 3, the layered structure 120 comprises at least one first layer 130 of a first material and at least one second layer 135 of a second material. In the example shown in FIG. 3, the layered structure 120 comprises three layers 130 of the first material stacked in alternating manner with two layers 135 of the second material. In embodiments, the first material is less rigid (e.g., more elastic) than the second material. In one example, the first material is a plastic foam (e.g., such as open cell polyurethane foam) and the second material is a plastic sheet (e.g., such as polycarbonate or polystyrene) that is more rigid than the plastic foam. Implementations of the invention are not limited to these exemplary materials, and other materials may be used for the layers 130, 135. In a preferred embodiment, the first material and the second material are different materials. However, in another embodiment, the first material and the second material are a same material.

In embodiments, the layered structure 120 comprises a composite structure in which the first layers 130 and the second layers 135 have different properties that contribute differently to (i) a stiffness of the layered structure 120 as a whole and (ii) an amount of friction between the individual layers 130 and 135. For example, the first layers 130 may be composed of a less rigid material that that contributes to a relatively higher coefficient of friction, such that these layers contribute more to the amount of friction between the individual layers 130 and 135 (compared to layers 135). Conversely, the second layers may be composed of a more rigid material, such that these layers contribute more to the stiffness of the layered structure 120 as a whole (compared to layers 130).

In embodiments, the first layers 130 are composed of a material with a different elastic modulus than the material of the second layers 135. For example, the first layers 130 may be composed of rubber (or foam) and the second layers 135 may be composed of plastic, where the rubber (or foam) has a lower elastic modulus than the plastic. This provides a composite layered structure where the plastic gives it a higher elastic modulus and the rubber gives it a higher coefficient of friction to improve jamming under vacuum.

In embodiments, the composite structure comprises an elastic material with a non-linear elastic property. In one example, the first layers 130 are composed of foam (e.g., such as open cell polyurethane foam), which has a unique property where the elastic modulus changes as it is compressed by a vacuum enclosure. As the foam is compressed, the elastic modulus can increase. For example, some foams have a stress-strain curve that has non-linear elastic regions within the elastic regime.

In accordance with aspects of the invention, the layers 130, 135 are free to slide relative to one another in a first state when the enclosure 115 is not evacuated, and the layers 130, 135 are inhibited from sliding relative to one another in a second state when the enclosure 115 is evacuated. In the first state, i.e., when the enclosure 115 is not under vacuum, the enclosure 115 does not apply a compressive force to the layered structure 120. This results in a first friction value between the layers 130, 135 in the first state. In the second state, i.e., when the enclosure 115 is under vacuum, the enclosure 115 applies a compressive force to the layered structure 120 by constricting inward around the layered structure 120. The compressive force pushes the first layers 130 against the second layers 135, predominantly in a normal direction as indicated by arrow N. This results in a second friction value between the layers 130, 135 in the second state, where the second friction value in the second state is much higher than the first friction value in the first state. The relatively low friction between the layers 130, 135 in the first state permits the brace 100 to be conformed to the torso 105 because the layers 130, 135 can slide easily relative to one another in this state. The relatively high friction between the layers 130, 135 in the second state facilitates locking the brace 100 into a fixed position after the brace 100 has been conformally placed on the torso 105.

According to aspects of the invention, the application of force to the layered structure 120, by way of applying suction to the interior of the enclosure 115, is referred to as jamming. In accordance with aspects of the invention, different amounts of suction applied to the interior of the enclosure 115 result in different magnitudes of force applied to the layered structure 120. In this manner, different rigidities of the brace 100 can be achieved by applying different amounts of suction to the interior of the enclosure 115. In this manner, the rigidity of the brace 100 may be tuned to the specific needs of a particular patient.

Figure 4:
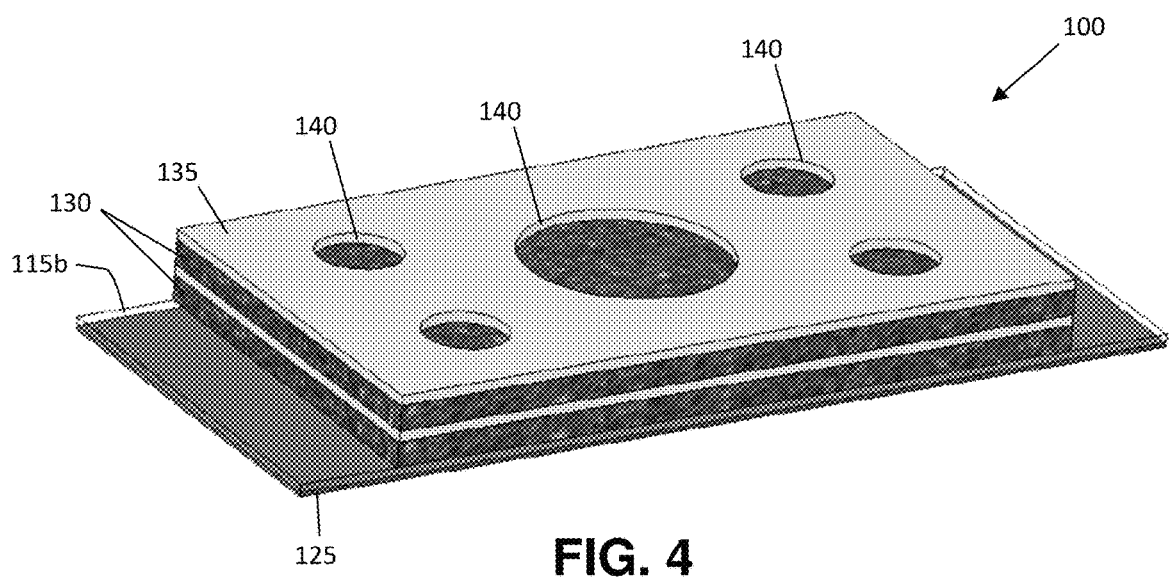
FIG. 4 depicts layers of a rib brace in accordance with aspects of the invention.

FIG. 4 shows a view of a portion of the brace 100 of FIG. 3 with the layer 115a and a top one of the layers 130 removed. As shown in FIGS. 3 and 4, one or more of the layers 135 may optionally include one or more features 140 that enhance the jamming by increasing the friction between the layers 130 and 135 when the layered structure 120 is jammed. The features 140 may include through-holes of any desired size and shape. In embodiments, when the enclosure 115 compresses the layered structure 120, portions of the layer 130 are pressed into the features 140, thereby increasing the friction between adjacent layers 130 and 135.

An exemplary method of using the brace 100 includes starting with the brace 100 in the first state, i.e., without having applied suction to the interior of the enclosure 115. With the brace in 100 in the first state, a user (e.g., doctor, etc.) conformally applies the brace 100 to the torso 105 of a patient in an area of interest (e.g., at an area of the torso 105 by which the brace 100 will help stabilize a broken rib within the patient). In embodiments, the user conformally applies the brace 100 to the torso 105 by bending and/or flexing different portions of the brace 100 so that the brace 100 fits snugly on and/or around different contours of the torso 105. In embodiments, the conformally applying the brace 100 includes adhering the brace 100 to the skin of the torso 105 using the adhesive layer 125 while the brace 100 is in the first state. In accordance with aspects of the invention, the method includes applying suction to the interior of the enclosure 115 after the brace 100 is conformally applied to the torso 105. In embodiments, suction is applied to the interior of the enclosure 115 via the port 110, e.g., using a suction device with a hose that connects to the port 110. As described herein, applying suction to the interior of the enclosure 115 causes the brace 100 to transition to the second state in which the enclosure 115 constricts around the layered structure 120 and, thus, increases the friction between the layers 130 and 135 of the layered structure 120. The suction is stopped when the brace 100 has attained sufficient rigidity. In this manner, the brace 100 is locked into shape on the torso 105 of the patient.

Figure 5:
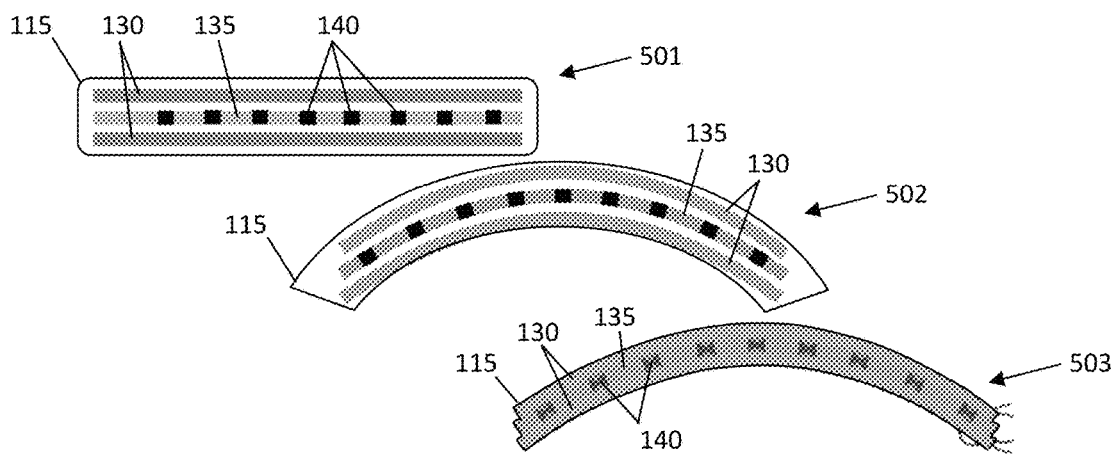
FIG. 5 depicts an interaction of layers of a rib brace in accordance with aspects of the invention.

FIG. 5 diagrammatically depicts steps of the method in accordance with aspects of the invention. At step 501, the brace 100 is in the first state. As depicted at step 501, while in the first state, the enclosure 115 is relatively loose around the layered structure 120 such that layers 130, 135 are not jammed. At step 502, while still in the first state, the brace 100 is conformally applied to a torso 105, e.g., by bending and/or twisting portions of the brace 100. At step 503, the layers 130, 135 are jammed by applying suction to the interior of the enclosure 115. The suction causes the enclosure 115 to shrink around the layered structure 120, thereby compressing the layers 130, 135 against one another. When holes 140 are present, portions of the layers 130 may be forced into the holes 140. The jamming causes the layers 130, 135 to lock their position relative to one another, such that the brace 100 is locked in a fixed shape while positioned on the torso 105 of the patient.

Figure 6:
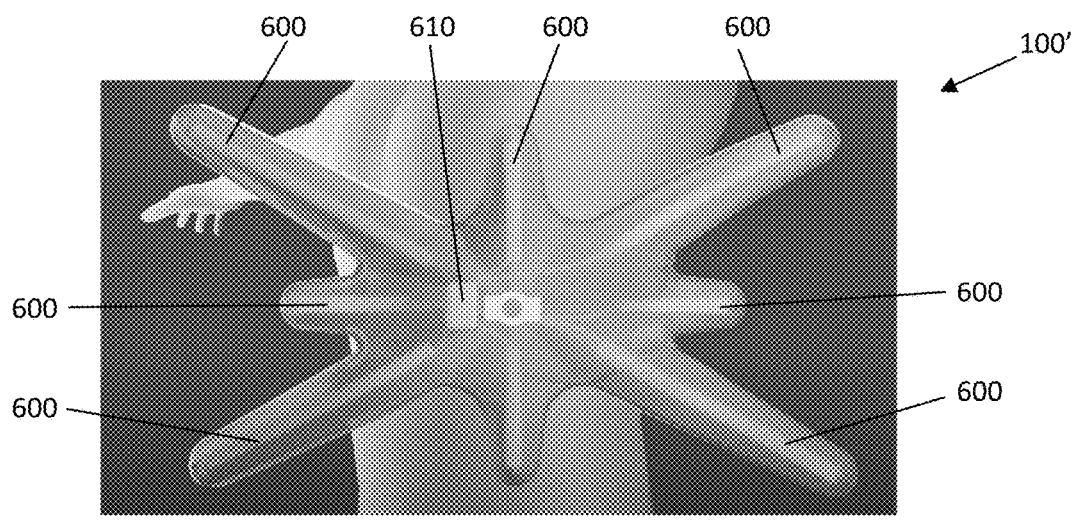
FIG. 6 shows another example of a rib brace in accordance with aspects of the invention.

FIG. 6 shows an embodiment of the brace 100' outfitted with sensors 600. In embodiments, the sensors 600 measure deflection of portions of the brace 100'. The sensors 600 may comprise strain gauges, for example, whose electrical output varies based on an amount of deflection experienced by the gauge. The sensors 600 can also include one or more accelerometers in addition deflection gauges. According to aspects of the invention, the sensors 600 are used to measure the patient's breathing while the patient is wearing the brace 100' on their torso 105. For example, although the brace 100' is much more rigid in the second state than in the first state, the brace 100' in the second state still has some degree of flexibility. As a result of this flexibility, the brace 100' can deflect in response to the patient's torso changing shape when the patient breathes, and the sensors 600 can be used to measure the deflection at different locations on the brace 100'.

In embodiments, the sensors 600 are optatively connected (e.g., by wiring) to control circuitry 610, which may comprise one or more of: a controller (e.g., one or more microprocessors, microcontrollers, digital signal processors, baseband processor integrated circuits, application specific integrated circuits, etc.); memory; battery; and wired or wireless communication system. In embodiments, the control circuitry 610 receives the data from the sensors 600 and communicates the data to a computing device that is external to the brace 100'.

The data from the sensors 600 can be used to monitor patient function and recovery, help plan treatments, and interact with patients throughout recovery including pulmonary rehabilitation. For example, the data from the sensors 600 may be analyzed to detect one or more of: deep breathing, cough, sneeze, reduced breathing, rate of breathing, minimums, maximums, averages, and patterns. In one exemplary use of the data from the sensors 600, the deflection detected by the sensors 600 can be compared to a predetermined baseline of deflection that occurs during normal breathing. In this example, a doctor or therapist may monitor this data (e.g., the actual deflection versus the baseline) to determine how the patient is progressing.

Figure 7A:
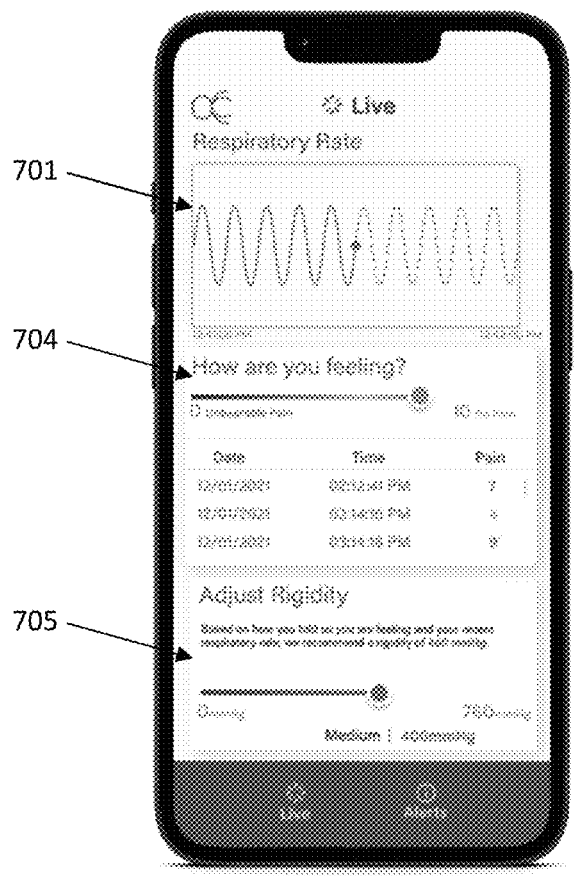
FIGS. 7A and 7B show examples of user interfaces in accordance with aspects of the invention.
Figure 7B:
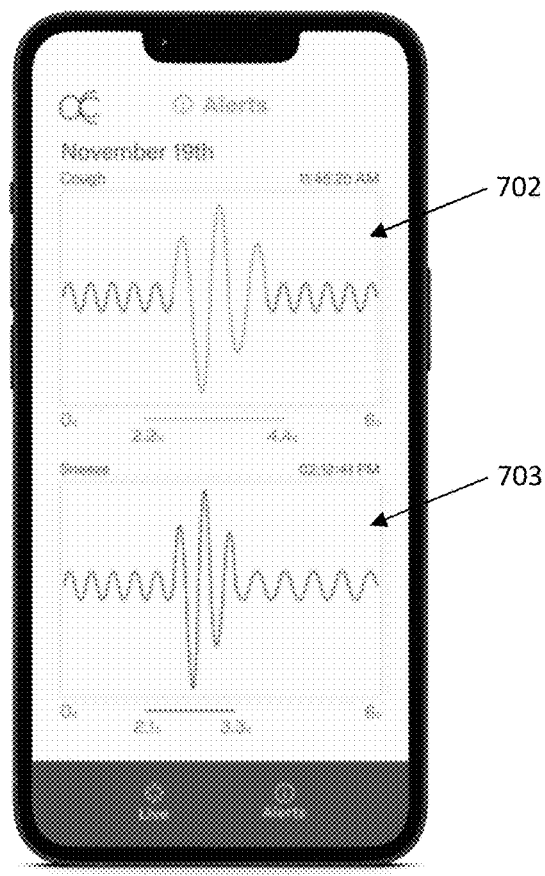

A doctor or therapist may monitor the data from the sensors 600 remotely (e.g., via their own computing device and the Internet) and provide feedback to the patient based on the monitoring. In one exemplary embodiment, the control circuitry 610 is paired to a patient's computing device such as a smartphone or a tablet computer, and a software application on the paired device can be used to provide information to the patient. In one example, the software application displays visualizations 701, 702, 703 of the data from the sensors 600, e.g., as shown in FIGS. 7A and 7B. In another example, the software application permits the doctor or therapist to send notifications to the patient. For example, the doctor or therapist may review the data from the sensors 600 and determine that the patient should adjust their breathing pattern (e.g., breath deeper), and the doctor or therapist may send a message to the patient to convey this instruction (e.g., take deeper breaths) via a notification of the software application on the patient's computing device. In another example, the software application includes a pain survey 704 by which the patient can provide input to tell their doctor their level of pain. Based on the pain survey input, the doctor may prescribe or adjust a vacuum prescription of the brace 100 (i.e., provide instructions to change the rigidity of the brace 100 by changing the amount of vacuum in the internal cavity inside the enclosure 115), e.g., as shown at 705. In another example, the software application can communicate with a suction device to control the suction device to adjust the amount of vacuum in the internal cavity inside the enclosure 115 as the brace is being worn by the patient.

In one embodiment, the sensors 600 and control circuitry 610 are integrated with the brace 100. In another embodiment, the sensors 600 and control circuitry 610 can be selectively connected to and disconnected from the brace 100. In this embodiment, a single rig of sensors 600 and control circuitry 610 can be re-used with plural different braces 100.

Implementations of the brace 100 may include strap receivers to connect a strap around the body to help keep the brace in position.

Implementations of the brace 100 may include extendable adhesive strips to better secure the brace to the torso.

Implementations of the brace 100 may include the ability to run cold/hot water through the brace 100 for therapeutics.

Implementations of the brace 100 may include the ability to link braces via a linking system.

Implementations of the brace 100 may include an inflatable layer in place of the foam layer for adjustability of pressure applied in certain areas. These areas of inflation can be independent and adjusted to meet patient needs/comfort.

In embodiments, portions of the brace 100 can be cut/trimmed for customization and resealed. For example, one of the appendages (shown in FIG. 1) may be trimmed to a smaller size, and then the enclosure 115 may be resealed (e.g., by heat welding where the trimming occurred).

In embodiments, the port 110 comprises a one-way valve. In this manner, once the layered structure 120 is jammed, the suction can be removed, and the system is sealed with pressure and holds its position without the need for continuous negative pressure.

In embodiments, the lamination jam sheet layer may be the exact size of a sponge layer to allow for the layers to bend on different radii which allows for a locked curve.

In embodiments, the layers 130, 135 are slippery upon one another, allowing for layer bending around a curve, until jammed and then they hold the curve.

Implementations of the brace 100 may be used to provide rib protection in contact sports. Typically, in contact sports such as football, a rib fracture happens due to the front to back compression of the chest which causes the rib to break at the side. The brace 100 can add rigidity to the rib cage to protect and reduce this compression.

Implementations of the brace 100 may be used as body protection panels that can be applied and tuned for body protection.

Implementations of the brace 100 may be used to provide protection against concussion by providing a tunable support for back of the neck to reduce whiplash.

Implementations of the brace 100 may be used in a sternotomy by using the brace 100 externally on the torso to alleviate pain after a sternotomy procedure.

Implementations of the brace 100 may be used in battlefield setting. For example, the brace 100 may be applied to close and brace wounds at the same time. For example, the brace 100 can be applied in emergency situations to brace, compress, and isolate wounds or trauma.

Additional aspects of the invention include manufacturing a brace 100 or 100' as described herein. Further aspects of the invention include manufacturing and/or using the brace 100 or 100' as described herein. Even further aspects of the invention include providing instructions for using the brace 100 or 100' as described herein. The instructions may be at least one of printed and video.

Figure 8:
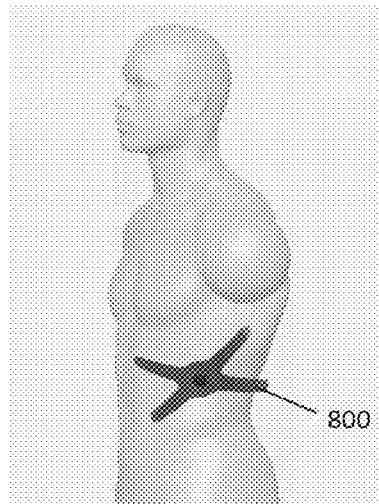
FIGS. 8-10 show another example of a rib brace in accordance with aspects of the invention.
Figure 9:
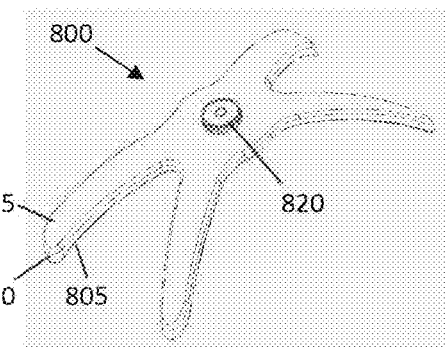
Figure 10:
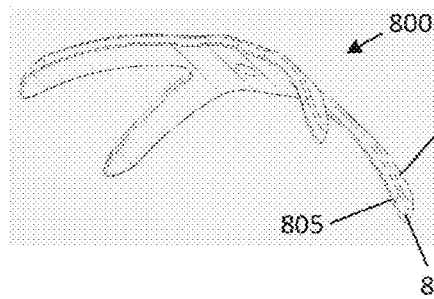

FIGS. 8-10 show another example of a rib brace 800 in accordance with aspects of the invention. In embodiments, and as shown in FIG. 8, the brace 800 is configured to secure to the patient's torso by adhesion and can be placed in various locations and positions with multiple sizes that can meet the needs of the patient.

As shown in FIGS. 9 and 10, the brace 800 includes an adhesion layer 805, a cushion layer 810, and a rigid layer 815. In embodiments, the adhesion layer 805 comprises a biocompatible adhesive such as biocompatible silicon adhesive, for example. In embodiments, the cushion layer 810 comprises a relatively soft material such as foam, such as Ethylene-Vinyl Acetate (EVA) foam, for example. In embodiments, the rigid layer 815 comprises a relatively rigid material such as thermoplastic, such as polypropylene, for example. In embodiments, the rigid layer 815 has a predetermined shape and stiffness. In embodiments, the rigid layer 815 may be further manipulated using various methods, such as heat, to better fit (e.g., tune) the brace 800 to the patient.

Figure 11:
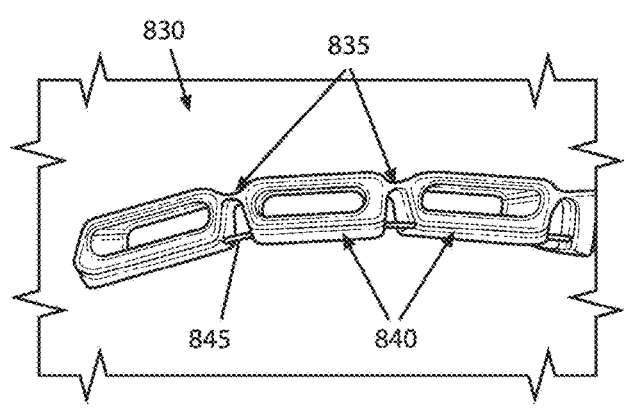
FIGS. 11 and 12 depict an internal mechanism of a rib brace in accordance with aspects of the invention.
Figure 12:
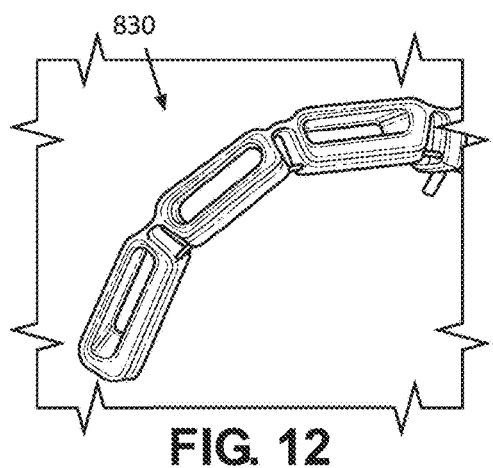

In accordance with aspects of the invention, the brace 800 has an adjustable stiffness. In embodiments, the stiffness is adjusted using an adjustment knob 820 that is operatively connected to a system inside the brace 800. In embodiments, the adjustment knob 820 allows the brace 800 to uniquely contour to the patient and provide tunable stiffness to the brace 800 once the brace 800 is placed on the patient. In embodiments, the system inside the brace 800 comprises a respective mechanism inside each of the appendages of the brace 800 (there being four appendages shown in FIGS. 8-10). An example, the mechanism 830 is shown in FIGS. 11 and 12. As depicted in the figures, the mechanism 830 has a design similar to e human finger where there are joints 835, pulleys, 840, and an actuating cable 845. The joints 835 may comprise a living hinge, for example. The actuating cable 845 is connected to the adjustment knob 820. In this manner, when the adjustment knob 820 is twisted in a first direction, the actuating cable 845 is pulled toward the center of the brace 800, which causes the mechanism 830 to bend as shown in FIG. 12. This bending adjusts the stiffness of the brace 800. The system may be designed in a such as way that the brace 800 can be placed in a specific contour with each mechanism 830 at a unique curve, and the system will stiffen and tighten from the set or initial location. This may be achieved by running one single cable throughout all the plural mechanisms 830 connected to a central hub at the adjustment knob 820. This creates the ability for the contour or curve of each appendage to be set in an initial position and when tightened, each appendage stiffens from that set curve position.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A medical brace, comprising:
    a sealed enclosure including an external adhesive layer that is configured to be adhesively fixed against a person externally and noninvasively to the person;
    a layered structure inside the sealed enclosure;
    a port through a wall of the sealed enclosure;
    at least one deflection sensor on the medical brace; and
    control circuitry on the medical brace, wherein the at least one deflection sensor is operatively connected to the control circuitry, and wherein the control circuitry comprises a wired or wireless communication system that is configured to communicate with a computing device that is separate from the medical brace,
    wherein a compressive force applied to the layered structure is adjustable by applying suction to an interior of the sealed enclosure via the port.

2. The medical brace of claim 1, wherein the layered structure comprises:
    at least one first layer comprising a first material;
    at least one second layer comprising a second material.

3. The medical brace of claim 2, wherein the second material is a different material than the first material.

4. The medical brace of claim 2, wherein the second material is more rigid than the first material.

5. The medical brace of claim 4, wherein the at least one second layer comprises a through-hole.

6. The medical brace of claim 2, wherein:
the sealed enclosure comprises a flexible sheet material; and
applying suction to the interior of the sealed enclosure causes the sealed enclosure to constrict around the layered structure.

7. The medical brace of claim 6, wherein the sealed enclosure constricting around the layered structure imposes the compressive force on the layered structure.

8. The medical brace of claim 7, wherein the compressive force on the layered structure increases an amount of friction between the at least one first layer and the at least one second layer.

9. The medical brace of claim 1, wherein the port comprises a valve.

10. The medical brace of claim 9, wherein the valve is biased to a closed state.

11. The medical brace of claim 1, wherein the at least one deflection sensor and the control circuitry are selectively connectable to and disconnectable from the medical brace.

12. The medical brace of claim 1, wherein the layered structure comprises:
a first layer and a third layer each composed of a first material; and
a second layer composed of a second material different than the first material, wherein the second layer comprises a through-hole, and wherein the second layer is between the first layer and the third layer in the layered structure.

13. The medical brace of claim 1, wherein the at least one deflection sensor is configured to measure breathing of the person wearing the medical brace based on deflection of the medical brace.

14. A medical brace, comprising:
a sealed enclosure including an external adhesive layer that is configured to be adhesively fixed against a person externally and noninvasively to the person;
a layered structure inside the sealed enclosure wherein layers of the layered structure comprise materials with different properties to form a composite structure;
a port through a wall of the sealed enclosure;
sensors on the medical brace, the sensors comprising at least one deflection sensor and at least one accelerometer; and
control circuitry on the medical brace, wherein the sensors are operatively connected to the control circuitry, and wherein the control circuitry comprises a wired or wireless communication system that is configured to communicate with a computing device that is separate from the medical brace and that is configured to measure breathing of the person wearing the medical brace based on data from the at least one deflection sensor and the at least one accelerometer,
wherein a compressive force of the layered structure is adjustable by applying suction to an interior of the sealed enclosure via the port.

15. The medical brace of claim 14, wherein the composite structure comprises:
a material with a higher elastic modulus; and
a material with a lower elastic modulus.

16. The medical brace of claim 14, wherein the composite structure comprises: an elastic material with a non-linear elastic property.

17. The medical brace of claim 14, wherein the composite structure comprises:
a first layer and a third layer each composed of a first material having a lower elastic modulus; and
a second layer composed of a second material different than the first material and having a higher elastic modulus,
wherein the second layer is between the first layer and the third layer in the composite structure.

18. The medical brace of claim 17, wherein the second layer comprises a through-hole.

19. The medical brace of claim 14, further comprising a software application that is configured to display visualizations based on the data from the sensors.

20. The medical brace of claim 19, wherein data from the sensors is configured for detecting one of more of deep breathing, coughing, sneezing, reduced breathing, or rate of breathing in the person wearing the medical brace.

* * * * *